(12) United States Patent
Yu

(10) Patent No.: US 9,209,927 B2
(45) Date of Patent: Dec. 8, 2015

(54) METHOD AND APPARATUS FOR GENERATION OF FREQUENCY- AND PHASE-LOCKED SUBCARRIER

(71) Applicants: ZTE Corporation, Shenzhen (CN); ZTE (USA) INC., Richardson, TX (US)

(72) Inventor: Jianjun Yu, Basking Ridge, NJ (US)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 19 days.

(21) Appl. No.: 14/054,958

(22) Filed: Oct. 16, 2013

(65) Prior Publication Data

US 2014/0212140 A1    Jul. 31, 2014

Related U.S. Application Data

(60) Provisional application No. 61/717,697, filed on Oct. 24, 2012.

(51) Int. Cl.
| | | |
|---|---|---|
| *H04J 14/00* | (2006.01) | |
| *H04J 4/00* | (2006.01) | |
| *H04J 14/02* | (2006.01) | |
| *H04B 10/548* | (2013.01) | |

(52) U.S. Cl.
CPC .......... *H04J 14/0298* (2013.01); *H04B 10/548* (2013.01)

(58) Field of Classification Search
CPC ............. H04J 14/0298; G02F 2203/56; G02F 2203/54; H04B 10/506; H04B 10/505
USPC ........................................................ 398/76
See application file for complete search history.

(56) References Cited

U.S. PATENT DOCUMENTS

| | | | | |
|---|---|---|---|---|
| 6,546,055 | B1* | 4/2003 | Schmidl et al. | 375/244 |
| 6,831,774 | B2* | 12/2004 | Fujiwara et al. | 359/326 |
| 6,924,924 | B2* | 8/2005 | Fujiwara et al. | 359/326 |
| 7,068,412 | B2* | 6/2006 | Fujiwara et al. | 359/276 |
| 7,953,303 | B2* | 5/2011 | Gheorma et al. | 385/3 |
| 8,494,378 | B2* | 7/2013 | Takasaka et al. | 398/201 |
| 8,582,983 | B2* | 11/2013 | Yu | 398/188 |
| 8,724,204 | B2* | 5/2014 | Qiu et al. | 359/238 |
| 2002/0015212 | A1* | 2/2002 | Fujiwara et al. | 359/238 |
| 2003/0142384 | A1* | 7/2003 | Kurebayashi | 359/237 |
| 2009/0310900 | A1* | 12/2009 | Sakamoto et al. | 385/3 |
| 2011/0081151 | A1* | 4/2011 | Yu et al. | 398/79 |
| 2011/0097029 | A1* | 4/2011 | Sakamoto et al. | 385/3 |
| 2011/0164658 | A1* | 7/2011 | Penninckx et al. | 375/130 |

(Continued)

FOREIGN PATENT DOCUMENTS

WO    WO 2011144460 A1 * 11/2011

OTHER PUBLICATIONS

Campany, J. et al., "Microwave photonics combines two worlds," *Nature Photonics* 1, 319-330 (2007).

(Continued)

*Primary Examiner* — Ken Vanderpuye
*Assistant Examiner* — Abbas H Alagheband
(74) *Attorney, Agent, or Firm* — Drinker Biddle & Reath LLP

(57) ABSTRACT

We describe and demonstrate a novel and simple scheme to generate flattened optical subcarriers using only phase modulators driven by single frequency fundamental sinusoidal sources. 160.8 Gb/s PM-QPSK experiment over a single subcarrier has been demonstrated.

10 Claims, 3 Drawing Sheets

(56) References Cited

U.S. PATENT DOCUMENTS

| | | | |
|---|---|---|---|
| 2012/0219296 A1* | 8/2012 | Yu | 398/79 |
| 2012/0229886 A1* | 9/2012 | Chen et al. | 359/326 |
| 2012/0230688 A1* | 9/2012 | Yu | 398/48 |
| 2013/0050795 A1* | 2/2013 | Qiu et al. | 359/238 |

OTHER PUBLICATIONS

Delfyett, P. et al., "Optical Frequency Combs from Semiconductor Lasers and Applications in Ultrawideband Signal Processing and Communications." *Journal of Lightwave Technology* 24, 2701-2719 (2006).

Jiang, Z. et al., "Optical arbitrary waveform processing of more than 100 spectral comb lines," *Nature Photonics* 1, 463-467 (2007).

Yu, J. et al., "1.96 Tb/s (21 x 100 Gb/s) OFDM Optical Signal Generation and Transmission Over 3200-km Fiber." *IEEE Photonics Technology Letters* 23, 1061-1063 (2011).

Ozharar, S. et al., "Ultraflat Optical Comb Generation by Phase-Only Modulation of Continuous-Wave Light." *IEEE Photonics Technology Letters* 20, 36-38 (2008).

Yamamoto, M. et al., "Optical Frequency Comb Generation Using Dual Frequency Optical Phase Modulation." *Proc. IPRA* 2005, *ITuF5* (2005).

* cited by examiner

METHOD AND APPARATUS FOR GENERATION OF FREQUENCY- AND PHASE-LOCKED SUBCARRIER

CROSS-REFERENCE TO RELATED APPLICATIONS

This application claims the benefit of U.S. Provisional Application 61/717,697 filed Oct. 24, 2012, which is incorporated herein by reference in its entirety.

BACKGROUND OF THE INVENTION

Introduction

Flattened and equality frequency spaced optical comb has many applications such as radio frequency photonics [1], all optical signal processing [2], optical arbitrary waveform generation [3], and WDM source for optical communication [4]. In all above applications, the comb spectra should be flat, low noise, and spread over a wide range [5 and 6]. Compared with comb generation by cascaded phase and intensity modulators [3], comb generation only by phase modulators is an attractive way because phase modulator based combs typically have much lower insertion losses and require no DC bias controller. However, subcarriers generated only by phase modulators which are driven by the same frequency sinusoidal RF source usually have very large tone-power difference (TPD) and not flattened. In this way, multiple frequency synchronous sinusoidal RF signals are required to generate flattened comb [5 and 6].

BRIEF SUMMARY OF THE INVENTION

In this disclosure, we describe and demonstrate a novel and simple scheme to generate flattened optical subcarriers at low insertion loss using only phase modulators driven by single frequency sinusoidal sources. A small frequency offset is introduced in the second stage to obtain phase-insensitive, stable and flattened subcarriers. Theoretical and numerical analysis with experimental results are carried out on this novel scheme. About 21 stable comb lines are obtained with power difference less than 3 dB. The good BER performance of 160.8-Gb/s PM-QPSK signal carried by one selected carrier clearly demonstrates the feasibility of this comb generation scheme.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

In the drawings.

DETAILED DESCRIPTION OF THE INVENTION

It is to be understood that the figures and descriptions provided herein may have been simplified to illustrate elements that are relevant for a clear understanding of the present invention, while eliminating, for the purpose of clarity, other elements found in typical optical signal generation apparatus and methods. Those of ordinary skill in the art may recognize that other elements and/or steps may be desirable and/or necessary to implement the devices, systems, and methods described herein. However, because such elements and steps are well known in the art, and because they do not facilitate a better understanding of the present invention, a discussion of such elements and steps may not be provided herein. The present disclosure is deemed to inherently include all such elements, variations, and modifications to the disclosed elements and methods that would be known to those of ordinary skill in the pertinent art.

Principle and Theoretical Analysis

Figure 1:
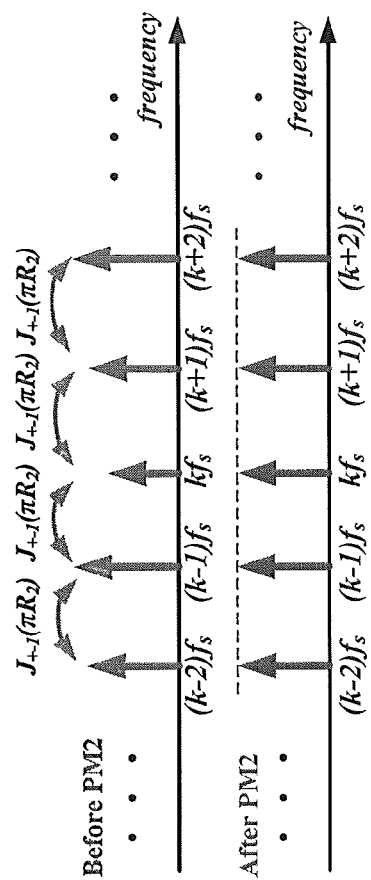
FIG. 1 shows the principle of comb generation by two stage phase modulators driven by single frequency RF sources with small frequency offset.
Figure 1:
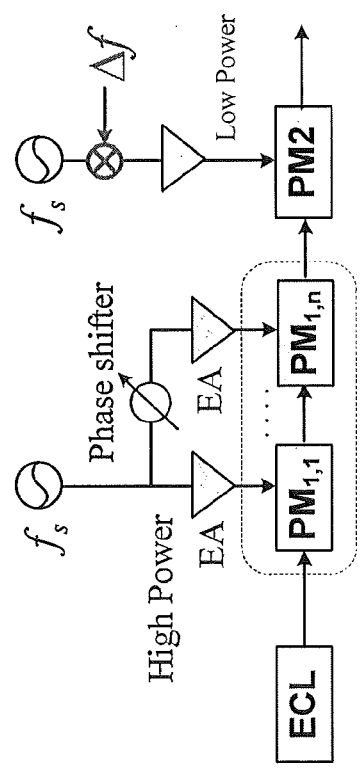

FIG. 1 shows the operating principle of the proposed novel optical comb generation with two stages phase modulations by single frequency RF sources with small frequency offset at different modulation depths. The CW lightwave from an external cavity laser (ECL) represented as $E_c = E_0 \exp(j2\pi f_c t)$ is modulated by cascaded two stages phase modulators: $PM_1$ and $PM_2$. $PM_1$ is driven by a sinusoidal RF clock source at $f_s$ with a high driving voltage of a few times of the half-wave voltage ($V_{90}$) in order to obtain high-order subcarriers. In practice, we use more than one phase modulators cascaded in series ($PM_{1,1 \sim n}$) duo to the limitation of electrical amplifier.

The phase modulators used here are identical and the drive signal $RF_1$ represented as $f_1(t) = R_1 V_\pi \sin(2\pi f_s t)$. The output optical signal after phase modulation can be expanded as $$E_{out1}(t) = E_c \exp[j\pi R_1 \sin(2\pi f_s t)] = E_o \sum_{n=-\infty}^{\infty} J_n(\pi R_1) \exp[j2\pi(f_c + nf_s)t] \quad (1)$$

where $J_n(\pi R_1)$ is the first kind Bessel function of order n, and $R_1$ is the modulation index representing the ratio of $RF_1$ signal amplitude to the half-wave voltage.

The generated optical subcarriers spaced at $f_S$ are then fed into the $PM_2$. First, assuming there is no frequency offset, the drive signal for second stage phase modulator $RF_2$ can be expressed as $f2(t) = R_2 V_\pi \sin(2\pi f_s t + \phi)$. Here, $\phi$ is the fixed phase difference. The output after $PM_2$ is $$E_{out2}(t) = \quad (2)$$

$$E_o \sum_{n=-\infty}^{+\infty} \sum_{k=-\infty}^{+\infty} [J_{n-k}(\pi R_1) J_k(\pi R_2) \exp(jk\varphi)] \exp[j2\pi(f_c + nf_s)t] =$$

$$E_o \sum_{n=-\infty}^{\infty} J_n(\pi R_c) \exp[j2\pi(f_c + nf_s)t]$$

where $R_c$ is the combined modulation index, and $R_c = \sqrt{R_1^2 + 2R_1 R_2 \cos\phi + R_2^2}$. Especially, $Rc = R_1 + R_2$ when $\phi = 0$.

It shows that, if the two stage phase modulators are driven by the same single fundamental frequency $f_s$ without any frequency offset, the output is the same with that of the single stage phase modulation with a combined driving signal. The output power of each tone of generated comb is still single-controlled. Thus, the output comb is still with large tone-power difference. However, when we change the phase difference to a variable as $\phi = 2\pi\Delta ft$ and $f_2(t) = R_2 V_\pi \sin[2\pi(f_s + \Delta f)t]$ with small frequency offset $\Delta f (\Delta f \ll f_s)$, the output after $PM_2$ can be changed to $$E_{out2}(t) = E_o \sum_{n=-\infty}^{+\infty} \sum_{k=-\infty}^{+\infty} |J_{n-k}(\pi R_1)||J_k(\pi R_2)| \exp[j2\pi(f_c + nf_s)t] \quad (3)$$

where the phase difference $\phi$ is averaged. In this way, the output is not a single phase modulation output, but a two stage output. The power of each tone is determined by the two stages of phase modulation index. Thus, we can adjust the power of the tones in the generated comb under two parameters, which gives a possibility to achieve flattened output.

Figure 2:
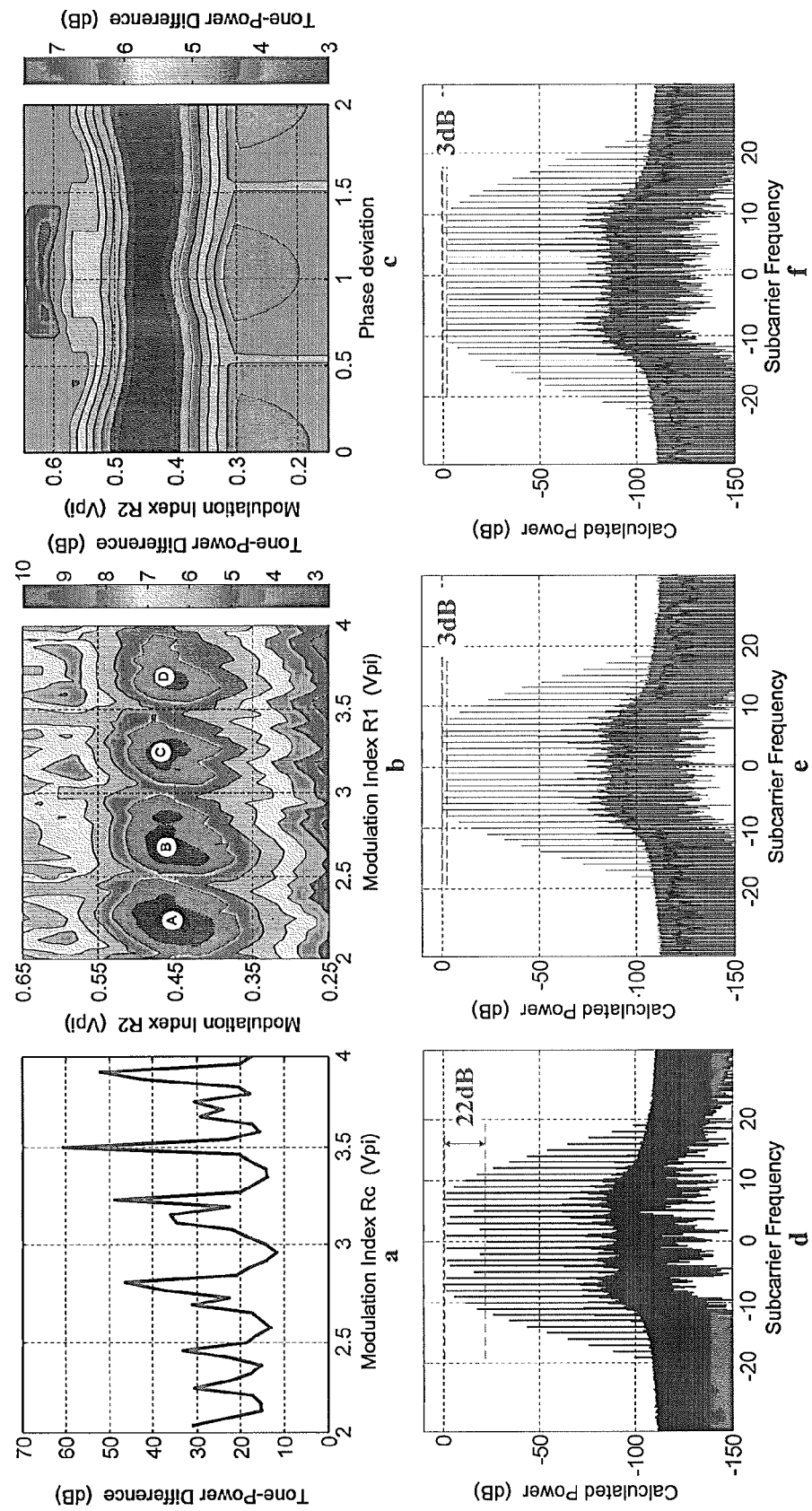
FIG. 2a shows tone-power difference varying with Re without small frequency offset.
FIG. 2b shows tone-power difference with R1 and R2 under small frequency offset.
FIG. 2c shows tone-power difference with R2 and phase deviation under small frequency offset.
FIG. 2d shows generated comb without frequency offset.
FIG. 2e shows generated comb with small frequency offset in zone A.
FIG. 2f shows generated comb in zone C with small frequency offset.

FIG. 2 shows the results of numerical simulation of two stages of phase modulation. FIG. 2(a) shows the tone-power difference (TPD) of generated comb varying with the combined modulation index Rc when there is no frequency offset, where the TPD is larger than 10-dB in the adjusting range.

However, results are different when we add a small frequency offset ($1 \times 10^{-5}$ fs) as shown in FIGS. 2 (b) and (c). FIG. 2(b) shows the results of TPD varying with the first and second stage phase modulation index $R_1$ and $R_2$. We can find four optimal zones (A, B, C, and D as marked out in FIG. 2(b)) in different range to generate flattened subcarriers with TPD less than 3 dB.

FIG. 2 (c) shows the impact of initial RF signal phase deviation of the second stage phase modulation. We can see that, the phase deviation between RF1 and RF2 has no impact on TPD. In this way, our scheme is more stable.

FIGS. 2 (d) and (e) shows the spectrum of generated comb in zone A ($R_1 = 2.25$, $R_2 = 0.45$) without and with frequency offset. We can see that, the TPD can be reduced from 22 dB to 3 dB. FIG. 2 (f) shows the result in optimal modulation index zone C ($R_1 = 3.25$, $R_2 = 0.45$), where flattened comb with about 21 subcarriers is generated and the TPD less than 3 dB.

Experiments Setup and Results

The comb generation and single subcarrier 160.8 Gb/s PM-QPSK demonstration experiment is carried out as shown in FIG. 3(a). The ECL output power at 1549.04 nm is 14.5 dBm and the laser line-width is less than 100 kHz. For the first stage phase modulation, we use two phase modulators $PM_1$, $PM_2$ cascaded in series and driven by two synchronous 25 GHz RF signals. The peak to peak voltage of RF signal after the booster EA is 13V and the half-wave voltage of phase modulator is about 4V. In this way the combined modulation index for the first stage phase modulation is around 3.25.

In order to obtain stable and flatten subcarriers, the second stage of phase modulator $PM_3$ is driven by 25.005 GHz RF signal (500 kHz offset) with $V_{pp}$ of 3.6 V. In this way, the modulation index of $PM_4$ is around 0.45. The modulation index of the first and second stage phase modulation is in the optimal zone C as analyzed above. After the comb generation, one optical filter with 3 dB bandwidth of 0.15 nm is used to select one subcarrier at 1549.04 nm. The chosen subcarrier is modulated by the IQ modulator which is driven by 40.2 Gbaud data with PRBS length of $(2^{13}-1) \times 4$ and biased at the null point respectively. Then the QPSK signal is polarization multiplexed to be 160.8Gb/s by the polarization multiplexer that includes PC, delay line and PBC. At the receiver, the coherent detection and offline digital signal process is used to demodulate the signal at the receiver [3].

Figure 3:
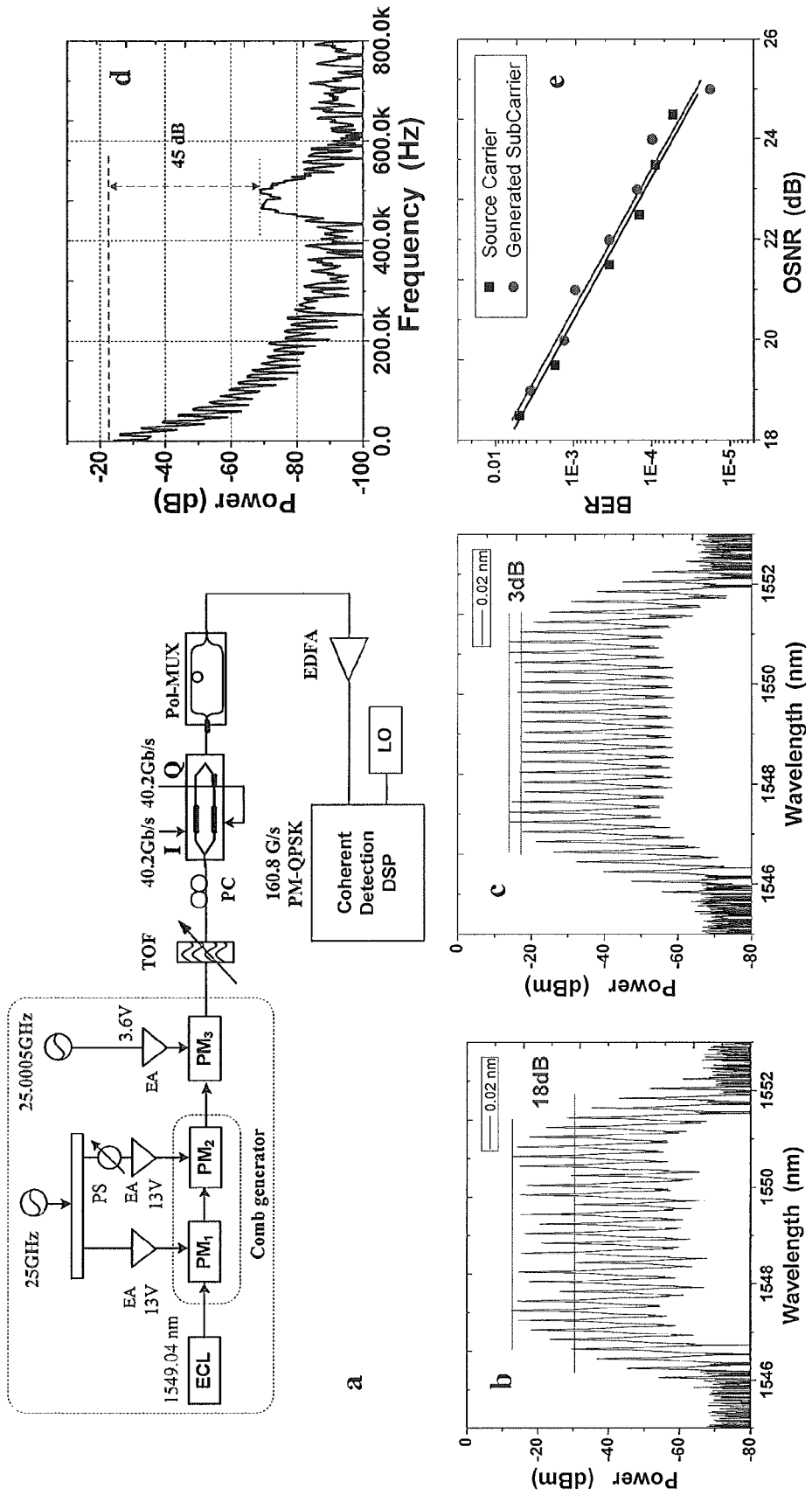
FIG. 3a shows Experiment setup.
FIG. 3b shows comb generated without frequency offset.
FIG. 3c shows comb generated with 500 kHz frequency offset.
FIG. 3d shows detected RF spectrum for one subcarrier.
FIG. 3e shows back to back BER performance varying with OSNR for generated subcarrier and source carrier.

FIG. 3 (b) shows the spectrum of comb generated after the first stage phase modulators $PM_1$ and $PM_2$, where about 19 subcarriers with 25 GHz frequency spacing are generated with tone-power difference large than 18 dB. The flattened subcarriers spectrum of final output after $PM_3$ is shown in FIG. 3(c). About 21 subcarriers are generated with carriers spacing of 25 GHz. The tone-power difference (TPD) of these subcarriers is reduced and less than 3 dB. The experiment results are in good agreement with simulation results. The resolution for FIG. 3(b) and (c) is 0.02 nm.

The measured RF spectrum of one subcarrier by self homodyne detection is shown in FIG. 3 (d), where we can see the 500 kHz sideband due to the frequency offset. However, the power ratio of main peak to the side band is larger than 45 dB. Thus, the impact of the low power 500 kHz side band can be ignored.

FIG. 3(e) shows the back to back BER versus OSNR for the 160.8-Gb/s PMD-QPSK signal in the case of the laser source carrier and generated subcarrier at 1549.04 nm, respectively.

We can see that the BER performance of the generated subcarrier is very similar to that of the source carrier from one ECL, which demonstrates the optical subcarrier generated by our scheme has good performance. We also measure and confirm that all the other optical subcarriers generated by our scheme exhibit the similar performance.

Conclusion

We describe and demonstrate a novel and simple scheme to generate flattened optical subcarriers at low insertion loss using only phase modulators driven by single frequency sinusoidal sources. A small frequency offset is introduced in the second stage to obtain phase-insensitive, stable and flattened subcarriers. About 21 stable comb lines are obtained with power difference less than 3 dB. The good BER performance of 160.8-Gb/s PM-QPSK signal carried by one selected carrier clearly demonstrates the feasibility of this comb generation scheme.

Although the invention has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

References

[1] J. Capmany, et al., Nat. Photonics vol. 1, 319-330, 2007.
[2] P. J. Delfyett, et al., J. of Lightwave Technol., 24, 2701-2719, 2006.
[3] Z. Jiang, et al., Nat. Photon. Vol. 1, 463-467, 2007
[4] J. Yu, et al., Photon. Technol. Lett., Vol. 23, 1061-1063, 2011.

[5] S. Ozharar, et al., Photon. Technol. Lett., Vol. 20, 36-38, 2008.
[6] M. Yamamoto, et al., Proc. IPRA 2005, ITuF5, 2005

What is claimed is:

1. A method for generating flattened and equally frequency spaced optical subcarriers, comprising:
    modulating a coherent optical carrier having a carrier frequency ($f_c$) in a medium having a half-wave voltage ($V_\pi$), using a series of substantially identical phase modulators as a first stage, each first stage phase modulator driven by the same sinusoidal radio frequency (RF) clock source having a source frequency ($f_s$), wherein the clock source to each phase modulator of the first stage is:
        phase shifted from the preceding phase modulator of the series except for the first, and
        voltage amplified to a first stage voltage $V_1$, wherein the quotient $V_1/V_\pi$, as a first phase modulation index ($R_1$) is greater than 2; and
    modulating the optical output of the first stage in a second stage using a phase modulator driven by a clock source of the frequency $f_s$ offset by an amount ($\Delta f$) chosen to be substantially equal to $1 \times 10^{-5}$ of $f_s$, and voltage amplified to a second stage voltage $V_2$, wherein the quotient $V_2/V_\pi$ as a second phase modulation index ($R_2$) is less than 2.

2. The method of claim 1, wherein the optical subcarriers are generated by the two stage modulations, and the equal spacing between the subcarriers is determined by $\Delta f$.

3. The method of claim 2, wherein $R_1$ and $R_2$ are chosen to produce a plurality of adjacent ones of the generated subcarriers with a tone power difference within a predetermined range.

4. The method of claim 3, wherein the predetermined range is 3 dB.

5. The method of claim 4, wherein a 160.8-Gb/s PM-QPSK signal is carried by a selected carrier and modulated by the first and second stages.

6. An apparatus for generating flattened and equally frequency spaced optical subcarriers in a medium with a half-wave voltage ($V_\pi$), comprising:
    a first modulation stage with a series of substantially identical phase modulators driven by the same sinusoidal radio frequency (RF) clock source having a source frequency ($f_s$), wherein the clock source into each phase modulator of the first stage is:
        phase shifted from the preceding phase modulator of the series except for the first, and
        voltage amplified to a first stage voltage $V_1$, wherein the quotient $V_1/V_\pi$ as a first phase modulation index ($R_1$) is greater than 2; and
    a second modulation stage using a phase modulator driven by a clock source of the frequency $f_s$ offset by an amount ($\Delta f$) chosen to be substantially equal to $1 \times 10^{-5}$ of $f_s$, and voltage amplified to a second stage voltage $V_2$, wherein the quotient $V_2/V_\pi$ as a second phase modulation index ($R_2$) is less than 2.

7. The apparatus of claim 6, wherein the optical subcarriers are generated by the two stages, and the equal spacing between the subcarriers is determined by $\Delta f$.

8. The apparatus of claim 7, wherein $R_1$ and $R_2$ are chosen to produce a plurality of adjacent ones of the generated subcarriers with a tone power difference within a predetermined range.

9. The apparatus of claim 8, wherein a 160.8-Gb/s PM-QPSK signal is carried by a selected carrier and modulated by the first and second stages.

10. The apparatus of claim 8, wherein the predetermined range is 3 dB.

* * * * *